(12) United States Patent
Johnson (10) Patent No.: US 6,420,719 B1
(45) Date of Patent: Jul. 16, 2002

(54) MODULATED INFRARED SOURCE

(75) Inventor: Philip M. Johnson, Windham, NH (US)

(73) Assignee: BAE Systems Information and Electronic Systems Integration, Inc., Nashua, NH (US)

( * ) Notice: Subject to any disclaimer, the term of this patent is extended or adjusted under 35 U.S.C. 154(b) by 0 days.

(21) Appl. No.: 05/543,296

(22) Filed: Jan. 20, 1975

(51) Int. Cl.[7] .............................. G01J 1/00; H04K 3/00; G02B 26/012; B64D 47/06
(52) U.S. Cl. .................. 250/504 R; 244/3.16; 340/981; 359/233; 359/235; 359/236; 359/298; 359/111
(58) Field of Search ................ 250/495, 504, 250/504 R; 340/50, 981, 982; 240/24, 49, 41.35 A, 41.35 C, 41.37, 41.47, 50; 350/259; 359/111, 235, 236, 233, 298

(56) References Cited
U.S. PATENT DOCUMENTS

| | | | | |
|---|---|---|---|---|
| 1,101,683 A | * | 6/1914 | Cote | 240/49 |
| 1,238,220 A | * | 8/1917 | Thurber | 240/49 |
| 1,417,457 A | * | 5/1922 | Cook | 240/49 |
| 1,989,862 A | * | 2/1935 | Horstmann | 240/49 |
| 3,886,350 A | * | 5/1975 | Katsukura | 240/24 |

FOREIGN PATENT DOCUMENTS

| | | | | |
|---|---|---|---|---|
| DE | 571661 | * | 3/1933 | 240/49 |
| IT | 200757 | * | 8/1940 | 240/49 |

* cited by examiner

*Primary Examiner*—Stephen C. Buczinski
(74) *Attorney, Agent, or Firm*—Daniel J. Loug (57) ABSTRACT

A modulated infrared source is disclosed in which spatial modulation is accomplished by the sweeping of an infrared beam past a point in space. In one embodiment close to 100% of the energy from the infrared source is focused by rotating optics including parabolically shaped reflectors about the source such that energy losses due to the modulation technique are minimized due to a single reflection of the energy from the IR source. The speed of the rotation of the reflective optics is minimized while maintaining sufficiently high modulation frequencies by the provision of four beams from a single source. In another embodiment a squirrel cage reflecting system is provided in which the energy from the IR source is reflected twice.

32 Claims, 4 Drawing Sheets

SPATIAL MODULATION
100% ENERGY UTILIZATION

MODULATED INFRARED SOURCE

This invention relates to modulated infrared sources and more particularly and generically to modulators in which spatial modulation is provided by the sweeping of an infrared beam past a point in space.

The modulation of infrared radiation, due to its long wavelength, has not been accomplished easily in the past. Problems in modulation of infrared energy include those of unwanted refraction due to the long wavelengths as well as absorption of the energy by the apparatus utilized in the modulation technique. Absorbed energy is reradiated in a diffused pattern thereby in many instances degrading the modulation. Additional problems center around materials which can withstand the infrared radiation while the same time being sufficiently light weight and structurally stable enough to withstand cyclic motion normally employed in the production of a modulated beam. It will be appreciated that when IR sources include heated elements, modulation of the energy to the element is ineffective to cause modulation of the radiation from the element due to the long heating and cooling cycles inherent with the IR sources in which elements are heated.

One of the most important applications of modulated infrared sources is in the area of infrared countermeasures. In this application, the modulated infrared source is employed to render ineffective heat seeking missiles which home in on the heat generated by the engines which propel the target at which the missile is aimed. These engines include internal combustion engines, jet engines, rocket engines, or the like.

In general, it is the purpose of the infrared countermeasure device to produce a modulated infrared signal of sufficiently high intensity to blanket or mask the infrared output from the above mentioned engines. Modulated infrared sources exist in the prior art which employ IR sources with temporal modulators for this purpose. In one embodiment temporal modulation involves the so-called "chopper" technique, in which apertures spaced from the source are sequentially covered and uncovered in a shutter technique. However, in these sources when the apertures are covered energy radiated from the IR source is either absorbed by the occluding member or reflected back into the source at a non-optimum angle such that this energy is lost. Where energy for the IR source is virtually unlimited, such as is the case when fuel is burned for the production of infrared radiation, temporal modulation techniques work well. Temporal modulation of electrically powered sources also works well where sufficiently large amounts of electrical power are available as in jet powered fighter aircraft. However, when the IR source must depend for its energy on electrical power which is critically limited it is desireable that as much of the energy from the IR source as possible be utilized in order that the infrared source radiate sufficient energy to blanket or mask the infrared energy from the target's engine.

Moreover, to provide omnidirectional or substantially omnidirectional coverage the infrared source must be omnidirectional so as to be able to countermeasure heat seeking missiles coming in from any direction. In the prior art this coverage has been obtained by the provision of a large number of apertures about an omnidirectional IR source. The modulation is obtained by the rotation of a cylindrically shaped mask in front of the apertures. While these systems are effective where unlimited power is available, the provision of temporal modulation presents a problem of efficiency which can be critical in many applications because the radiation from the source may be blanketed or masked by the radiation from the target.

Moreover, due to the limited power available the coupling of 100% of the power from the IR source out of the source is so critical that the shape of the projected infrared image becomes exceedingly important. Assuming a line source, it has been found that refractive optics which would ordinarily focus and couple out a great deal of the energy from the IR source suffer from the fact that the radiated image is not linear. If the image is considered to be rectangular, with the use of refractive optics, the long sides of the rectangle are bent inwardly in a concave manner. Thus, maximum intensity appears at the center of the rectangular image, with the energy being somewhat reduced towards the ends of the image. When energy levels are critical the refractive optics may result in a situation where the energy from the infrared source is enough less than that of the energy from the target's engines such that the infrared source is blanketed or masked by the infrared energy from the target rather than the other way around. The ratio of infrared energy from the source vis-a-vis infrared energy from the target is called the jam-to-signal ratio and this ratio is a measure of the effectiveness of the infrared source as a countermeasure. It will be appreciated that if this ratio is greater than 1, the infrared source can be effective as a countermeasure.

The above problems are solved by the subject invention in which close to 100% of the infrared energy is coupled out into space by "spatial modulation". The term "spatial modulation" as used herein refers to the sweeping of an infrared beam past a point in space removed from the infrared source a number of times per second, corresponding to the frequency of the modulation. In one embodiment of the subject invention this is accomplished by rotation, reciprocating or, in general, moving the focusing optics about a stationary infrared source at a speed commensurate with the modulation frequency desired. The optics in a preferred embodiment are reflective optics although refractive optics may be utilized in situations in which the energy degradation caused by the refractive optics is not critical. The reflective optics in this embodiment comprise reflectors which in cross section each conform to a portion of a set of parabolas which surround an infrared source. These reflectors generate highly defined beams with unusually sharp edges. The source is located at the focus of the aforementioned parabolas and the parabolas are rotated about their focii. Multiple reflectors may be provided to provide multiple beams. In general this system is one in which there is only one reflection of the infrared radiation from the source thereby minimizing energy losses. This type modulation produces a vertical line (or beam) which subtends almost 180° of an arc such that as the line sweeps out 360° of azimuth a sphere of protection is provided. With this wide angle sweep, the modulation apparatus may be mounted anywhere on the outside of the aircraft to be protected. While the aircraft may block some of the radiation from the source, in the far field blocked radiation is minimal.

In an alternative embodiment, a squirrel cage reflector arrangement is rotated about an infrared source, with the fins on the squirrel cage focusing the divergent radiation from the source into collimated beams. In this embodiment radiation impinging on the leading surface of one blade is reflected onto the trailing surface of the next preceding blade. Thus in this embodiment two reflections occur. As in the preceding embodiment, omnidirectional protection is also provided by the squirrel cage arrangement.

It is therefore an object of this invention to provide an improved modulated infrared source.

It is another object of this invention to provide a spatially modulated infrared source in which an infrared beam is swept by a position in space.

It is a further object of this invention to provide modulation of an infrared source by the moving of focusing optics with respect to the infrared source.

It is a still further object of this invention to provide an improved infrared countermeasure device.

It is yet another object of this invention to provide an improved infrared modulating system in which sharply defined infrared pulses are generated.

It is a still further object of this invention to provide reflective focusing for an infrared source in which the beam formed by the focusing means is extremely sharp and well defined in the infrared region of the electro-magnetic spectrum.

It is a yet still further object of this invention to provide a modulated omnidirectional infrared radiation source isotropic in azimuth.

These and other objects of this invention will be better understood in connection with the following description in view of the appended drawings in which:

DETAILED DESCRIPTION

Figure 1:
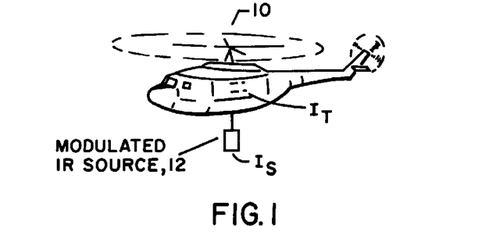
FIG. 1 is a diagramatic representation of a typical infrared countermeasure situation.

Referring now to FIG. 1, a target 10 such as a helicopter is provided with a modulated infrared source 12. This source is omnidirectional such that a sphere of protection is provided around the target. Because of the internal combustion or jet engine of the target the target radiates in the infrared region of the electro-magnetic spectrum. The intensity of this infrared radiation is designated $I_T$ and in general involves a particular signature which varies with the configuration of the target as well as with the particular heat generating engine utilized. The intensity of the modulated infrared source is designated $I_S$. If the ratio $I_S$ to $I_T$ at any point in the far field is equal to or greater than 1 the modulated infrared source can be effective in countermeasuring incoming heat seeking missiles. Moreover, in some circumstances this ratio can be less than 1 and the modulated source will still be effective as a countermeasure. It is the function therefore of the modulated infrared source to produce modulated radiation of sufficient intensity to blanket or mask the essentially CW infrared radiation from the target to reduce the ability of the heat seeking missile to track the target and indicate to the heat seeking missile that the target is at a position in space removed from its actual position so that the heat seeking missile homes in on a point in space at a distance sufficiently removed from the target to prevent damage to the target. This has been accomplished in the past by modulating the infrared source so that the detected radiation has a predetermined pulse pattern commensurate with that of the homing system of the missile.

As mentioned hereinbefore, where energy availability is not a problem as with the burning of fuel for the infrared source, achieving the requisite $I_S/I_T$ ratio can be easily accomplished. However, for those targets in which energy is at a premium a more efficient modulating means than the temporal modulation of the prior art is necessary.

Figure 2:
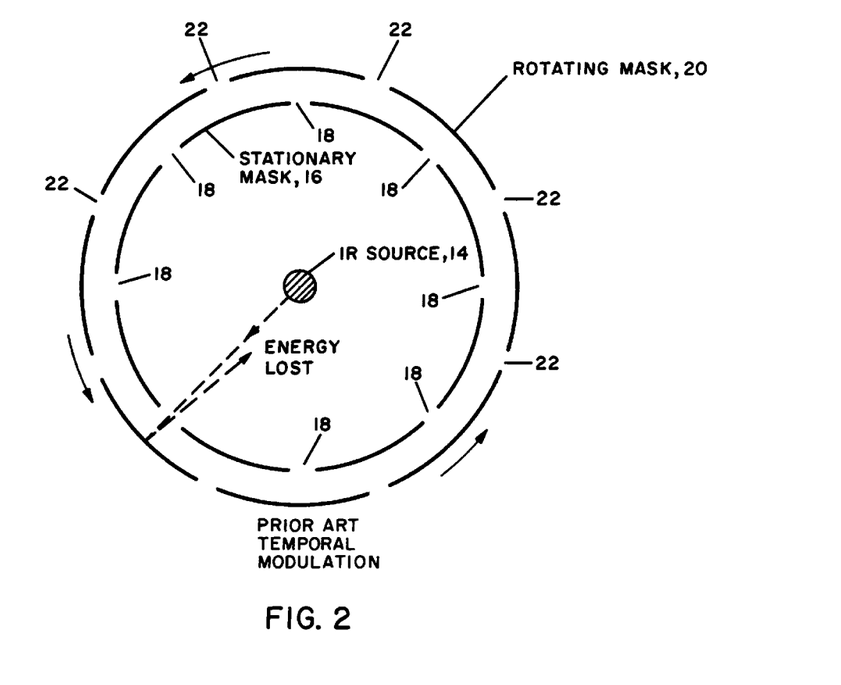
FIG. 2 is a diagramatic representation of a temporal modulator.

Temporal modulation of an infrared source, commonly known as "chopping", may be accomplished by the apparatus illustrated in FIG. 2. In this case an infrared source 14 is located within a stationary mask 16 which has apertures 18 spaced around the periphery. The stationary mask is located co-axially with respect to a rotating mask 20 having apertures 22 which, when the mask 20 is rotated come into alignment with apertures 18 in the stationary mask. When apertures 18 and 22 are in alignment radiation from the infrared source 14 is transmitted to the far field. When there is misalignment between apertures 18 and 22 energy from the infrared source is either absorbed by the rotating mask or reflected back to the infrared source. It will be appreciated that a large portion of this energy is lost in this process, making the temporal modulator of FIG. 2 unacceptable in situations where only a limited amount of energy is available. As mentioned before, when energy is not at a premium the temporal modulation technique illustrated in FIG. 2 is entirely satisfactory for countermeasure purposes. However, because the energy is not focused from the IR source and more importantly because during a portion of the cycle the energy is absorbed by the rotating mask, the temporal modulation is not desired.

Figure 3:
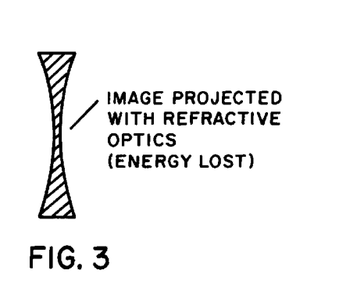
FIG. 3 is a diagramatic representation of an image projected with refractive optics.
Figure 4:
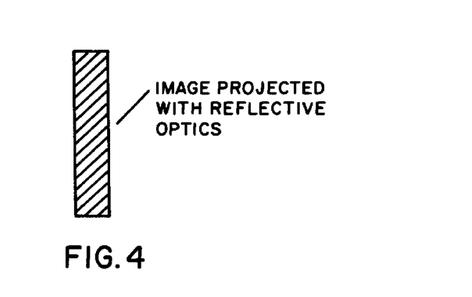
FIG. 4 is a diagramatic representation of an image projected with reflective optics of the type constructed in accordance with the subject invention.

In addition to the provision of energy of the requisite intensity so that the above mentioned ratio is favorable, there is the problem of providing isotropically projected energy around an azimuth such that the energy is not distorted. When refractive optics are utilized to focus energy from an infrared source the image projected is not isotropic as illustrated in FIG. 3 but rather is broadened towards the edge of the image when a line source is projected. Thus when the modulated IR source is operating with very little tolerance in the margin necessary for the appropriate ratio it will be appreciated that intensity near the edge of the projected image may drop below the required ratio and thus the modulated source will be ineffective as a countermeasure. It is therefore desirable to project an image such as illustrated in FIG. 4 from a line source, in which the projected image is not too distorted. For the isotropically projected image the energy distribution across the projected image is uniform and maximized so that maximum use of the infrared source is possible.

However, when energy is at a premium spatial modulation is preferred to utilize more of the energy from the IR source.

Figure 5:
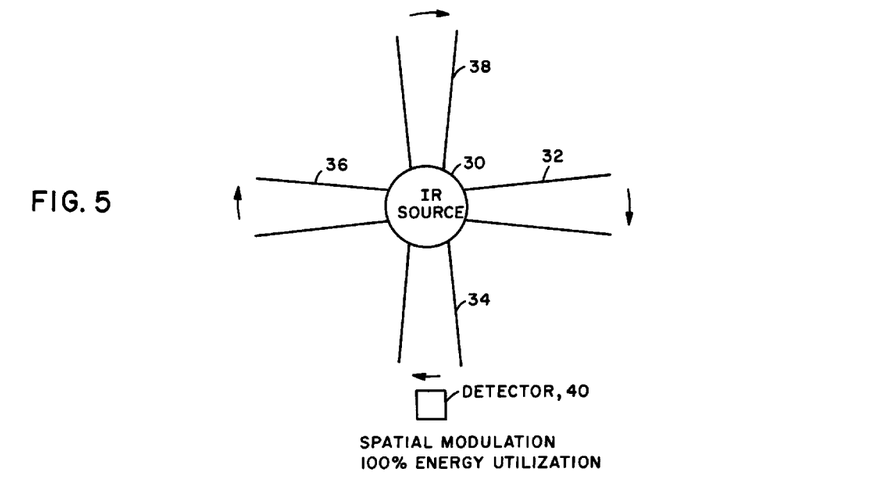
FIG. 5 is a diagramatic representation of a four beam spatial modulation technique.
Figure 6:
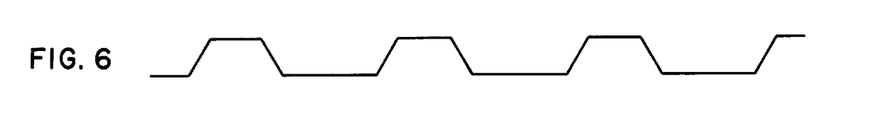
FIG. 6 is a waveform diagram of intensity vs. time for radiation from the source of FIG. 5 as detected at a point in space removed from the source.

Referring to FIG. 5, the concept of spatial modulation is illuminated. In general, spatial modulation refers to the transmission of one or more focused beams from an infrared source. In this diagram an infrared source 30 is illustrated as projecting four narrow collimated beams 32, 34, 36 and 38. As illustrated the beams are made to rotate or revolve about the source such that the beams are swept by a detector 40 sequentially. The desired waveform at the detector 40 is illustrated in FIG. 6 to be relatively sharp pulsed waveform in which the rise and decay of the pulse occurs rapidly. As mentioned hereinbefore, because of the relatively long wavelength of the infrared radiation the obtaining of such a sharp waveform is difficult. Generation of such a waveform will be described in connection with FIG. 9 et sequi. However, for the present purposes of discussion spatial modulation refers to the sweeping of a collimated infrared beam past a point in space.

As illustrated in FIG. 5, four beams are rotated or swept past detector 40. The reason for the four beam configuration is now described with reference to FIG. 7.

Figure 7:
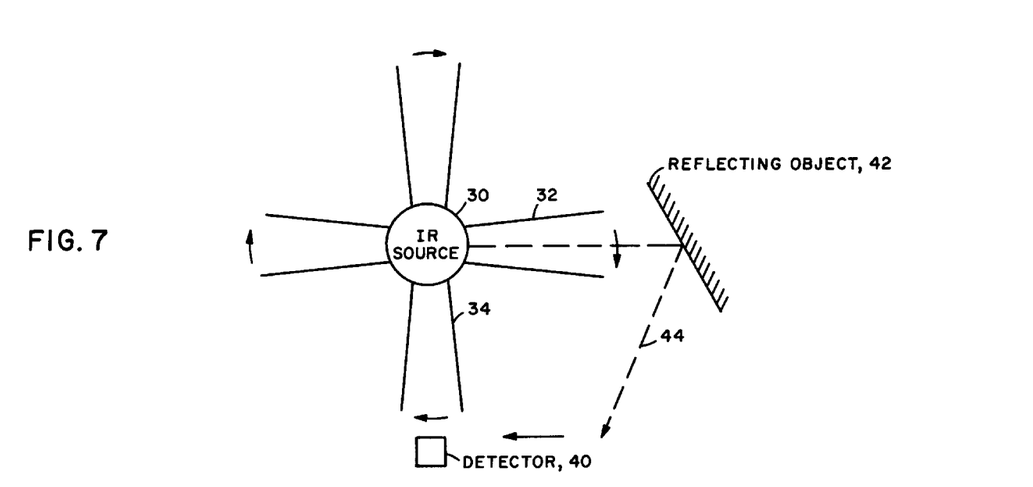
FIG. 7 is a diagramatic illustration of a spatially modulated infrared source in which a portion of the radiation impinges on a reflecting object and is reflected in the vicinity of a detector spaced from the IR source.

Referring to FIG. 7, infrared source 30 projects a narrow beam, beam 32. When the infrared source is located at a target it is possible that portions of the target close to the infrared source may act as reflectors for the source. These reflectors may inadvertently provide that the infrared radiation reaching detector 40 will resemble more a dc signal than a modulated signal. As illustrated in FIG. 7 a reflective object 42 may be in the path of beam 32 such that beam 32 is reflected as illustrated by a dotted line 44 towards detector 40 and will arrive at detector 40 after beam 34 has been detected.

Figure 8:
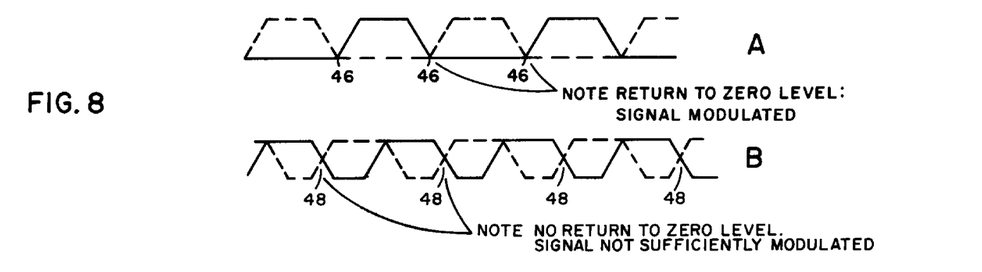
FIG. 8 includes a series of waveform diagrams illustrating the effect of reflected radiation on the output of the IR source of FIG. 7 at a point removed from the IR source.

Referring to FIG. 8, and more especially to waveforms designated A, the waveform from the reflecting object illustrated by the dotted pulse waveform may occur such that the detected signal returns to zero thereby preserving the modulation. As can be seen the combined waveform returns to a zero level at points 46. Thus while the detected signal will have a component from the reflecting object it will be appreciated that the detected signal is still modulated albeit at some other frequency.

Referring to waveforms designated B of FIG. 8, if a larger number than four beams are projected, radiation returned from the reflecting object may overlap significantly the direct radiation from the infrared source such that there will be no return to zero of the radiation detected by detector 40. The closest that the combined waveform comes to reaching the zero level is illustrated by points 48. Thus it is possible that a signal which is not sufficiently modulated will result. In general the maximum number of beams that can be projected without substantial reflective interference is a function of the duty cycle of the pulse train produced at a point in space removed from the source.

More specifically:

$$\text{the maximum number of beams} = 2 \times \frac{1}{\text{duty cycle}} \quad (1)$$

where, $$\text{the duty cycle} = \frac{\text{angular beam width measured at 0 level of beam}}{\text{angular spacing between the beams}} \quad (2)$$

For a 50% duty cycle, the largest number of beams that can be produced without the possibility of substantial overlap is 4, with the four beams spaced at 90°. When the beam width of the radiation is no more than 45° it is possible to limit the effects of reflected radiation so that the modulation is not destroyed.

It will be apparent that the narrower the beam the narrower the pulses produced and the more beams that can be projected without destructive interference due to reflection. Conversely the wider the projected beams the wider the pulses produced and the lower the number of beams that can be projected without interference. In general the wider the beam the wider the pulses produced and the greater the chance of overlap.

As a practical matter, anywhere from one to four beams may be utilized. If one beam is utilized, it will be appreciated that the optics necessary to form this beam must be rotated at high speeds. The speed decreases with the number of beams with the optimum being a four beam configuration. The tradeoff is essentially the mechanical stability of the rotating optics and the ability to dynamically balance the rotor versus the narrowness of the beams and the duty cycle.

Figure 9:
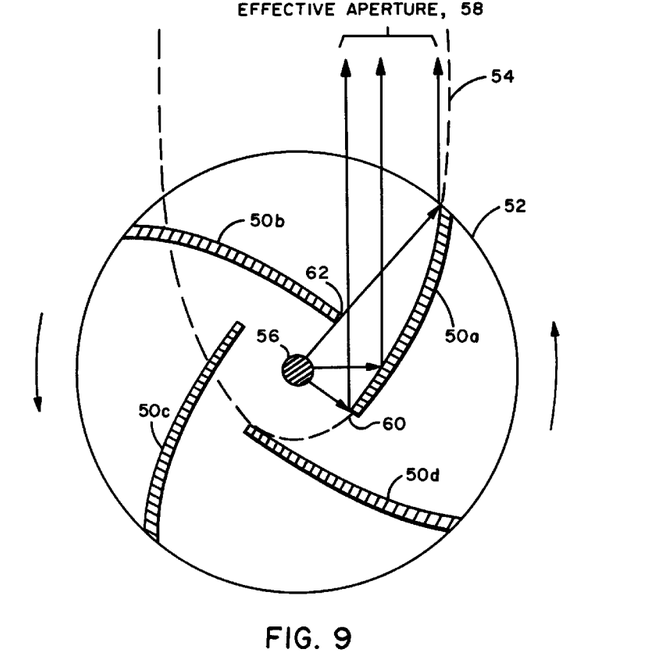
FIGS. 9 and 10 illustrate spatial modulators with single reflectors blocked partially by preceding reflectors to form the beams.

Apparatus which can efficiently provide spatial modulation while at the same time providing close to 100% energy utilization is illustrated in FIG. 9.

Referring now to FIG. 9, a preferred embodiment for the spatial modulator which involves the revolution of a focusing element around an omnidirectional infrared source includes in this example four reflectors 50 each located on a rotating base plate 52 such that each of the four reflectors forms a reflective surface which conforms in cross section to a portion of a parabola 54 which has an infrared source 56 at its focus. This source may be in the form of an electrically heated cylindrical rod of silicon carbide made by the Norton Corp. under the trademark CRYSTAR across which electrical energy is applied to heat the rod. The beams from this apparatus are narrow vertical lines of infrared radiation which subtend a vertical arc of close to 180°, making this a very wide angle source. When these lines are swept 360° in azimuth with the revolution of the focusing elements around the source—a sphere of protection is provided for the aircraft on which this modulated source is mounted. Because of its omnidirectional coverage, this modulated IR source can be mounted virtually anywhere on the outside of the aircraft to be protected. While the aircraft body may block some of the modulation from the source, in the far field this is minimal.

It will be appreciated that in this embodiment only one side of the parabola is used to locate a reflecting surface. As illustrated, the parabolic surface to which a reflector is to conform is the locus of a set of parabolas stacked vertically such that reflector 50a is located on the side of the set of parabolas to the right of the source. This set of parabolas is rotated 90° counterclockwise to form reflector 50b. This set of parabolas is then rotated another 90° to form reflector 50c and still another 90° to form reflector 50d. Each set of parabolas is revolved about their focii which is also the locus of source 56.

The reflectors may be fabricated out of rolled aluminum strips mounted on rotating base plate 52. The source may or may not rotate with the plate. If the source is electrically driven it is preferable that the source be stationary.

It will be appreciated that the effective aperture 58 of this modulator is such that it is bounded by edge 60 of one reflector and edge 62 of a preceding reflector. It will be appreciated therefore that the effective aperture is limited by the positioning of the preceding reflector. In this manner a narrow beam of infrared energy is coupled out of the system with a single reflection. In this system the beams are rotated 360° in azimuth to provide omnidirectional protection. The vertical beam angle is close to 180° so that a sphere of protection is provided with each 360° sweep.

Figure 10:
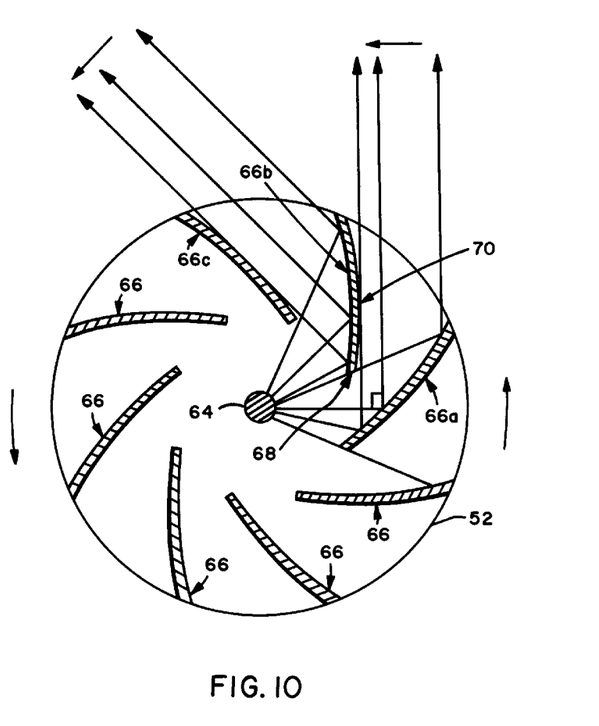

As illustrated in FIG. 10 the number of reflectors which may be mounted on rotating base plate 52 is limited only by the size of the effective aperture desired. In this case a source 64 of infrared energy radiates omnidirectionally towards reflectors 66. The aperture for radiation which emanates from a reflector 66a is limited by the position of a preceding reflector 66b as illustrated. The back surface of the preceding reflector is made non-reflecting, as by blackening, to prevent further reflection. In this case a lower edge 68 of a reflector is utilized as a mask for the succeeding reflector while the point 70 on the surface of a preceding reflector limits the other side of the aperture. This embodiment also offers omnidirectional coverage and can therefore be mounted virtually anywhere on the outside of the aircraft to be protected.

Figure 11:
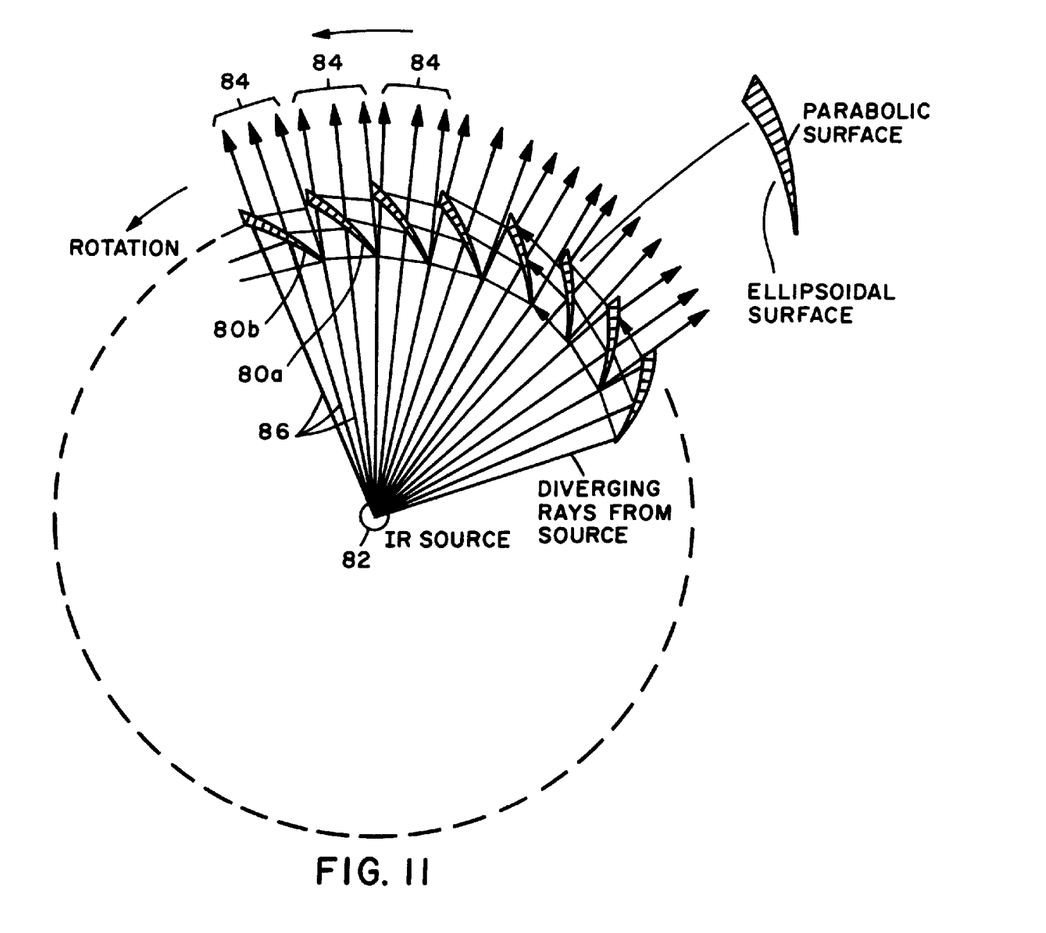
FIG. 11 is a diagramatic representation of a squirrel cage infrared source modulator.

If reflection is not a problem, a spatial modulating technique involving a squirrel cage modulator may be preferred. This configuration also produces omnidirectional coverage and can be mounted virtually anywhere on the outside of the aircraft to be protected. The technique is illustrated in FIG. 11 in which a number of reflective elements 80 are located about the periphery of a cylindrical cage such that between each of the elements there is a space. Each of the elements is formed as a blade having a leading surface which conforms to a portion of a vertically arranged set of ellipses and a trailing surface which conforms to a portion of a vertically arranged set of parabolas such that diverging radiation from an infrared source 82 is reflected from a leading surface of one reflector, e.g. 80a, to the trailing surface of a preceding reflector 80b. As a result of this reflection collimated beams of light 84 are produced with dark spaces inbetween the collimated beams. In this embodiment, the diverging rays 86 from source 82 are collimated by the reflecting blades located about a cylindrical body thereby forming the squirrel cage arrangement. The reflective elements are such that the leading surface of the reflector has an elliptical cross section, e.g. the cross section conforms to a portion of an ellipse, whereas the trailing surface of the reflector has a cross section which is a portion of the parabola. One focus of all the ellipses is located at the infrared source. The second focus of each ellipse is located at different places along a circle having the infrared source as its center for each reflective element. For a given reflective element, however, the second focus of the ellipse of the leading surface is coincident with the focus of the parabola which forms the trailing surface of the next preceding reflector. Thus, the focus of the parabolically shaped trailing edge of one reflector is actually the second focus of the ellipse which forms the leading edge of the succeeding reflector. In one embodiment the equations for the ellipses and parabolas are as follows:

$$\text{ellipse: } Y_e = \sqrt{6.00X - 0.500X^2}; \quad (3)$$

$$\text{parabola: } Y_p = -X - 1.6071 + \sqrt{21.2587X + 15.15937} \quad (4)$$

In equations (3) and (4) the X and Y axes are the coordinate system which would normally be used to describe the ellipse of a leading surface and the X axis runs through both focii of the ellipse.

What has been obtained by the ellipse-parabola combination is that since the parabola has the same focal point as the second focus of the succeeding ellipse the parabola is being used as a negative element, e.g. convex, in this case collimating the converging bundles of rays incident on it, with the ellipse acting as a positive element of the pair.

What has been provided therefore is a number of spatial modulating techniques. When a single source is utilized it may be stationary with focusing optics revolving around the same. The revolving of the beams in each case provides spatial modulation of radiation at a fixed point in space removed from the source. Also reciprocation or any cyclic movement of the optics will provide spatial modulation. It will be apparent that direction of rotation, reciprocation, or movement is not critical in any of the embodiments illustrated.

Although a specific embodiment to the invention has been described in considerable detail for illustrative purposes, many modifications will occur to those skilled in the art. It is therefore desired that the protection afforded by Letters Patent be limited only by the true scope of the appended claims.

I claim:

1. Apparatus for countermeasuring a heat seeking missile approaching a heat radiating target in which the heat seeking missile has a guidance system comprising:

an infrared source at said target, and means for spatially modulating the radiation from said infrared source by generating a beam of infrared radiation and by periodically sweeping said beam past points in space to generate a number of pulses of infrared energy at each point in space for causing the guidance system in said heat seeking missile to guide said missile away from said target, said spatial modulating means including reflective means adapted for movement about said infrared source, said reflective means including reflective elements each conforming in contour to a portion of a parabola having said infrared source at its focus, said reflective elements being spaced from said generating means and positioned such that all of the radiation from said generating means is reflected once and is collimated into beams which radiate outwardly from said source at different angles.

2. The apparatus of claim 1 wherein said beams are equally spaced about said source.

3. The apparatus of claim 1 wherein a portion of a preceding reflective element blocks radiation from a portion of a succeeding reflective element to form one edge of a beam.

4. The apparatus of claim 3 wherein the portion of the preceding element blocking radiation from a portion of a succeeding reflective element includes an end portion of said preceding reflective element.

5. The apparatus of claim 3 wherein each of said reflective elements has a nonreflective back surface and wherein a portion of said nonreflective back surface serves as the portion of the preceding reflective element which blocks radiation from a portion of a succeeding reflective element.

6. Apparatus for countermeasuring a heat seeking missile approaching a heat radiating target in which the heat seeking missile has a guidance system comprising:

an infrared source at said target, and means for spatially modulating the radiation from said infrared source by generating a beam of infrared radiation and by periodically sweeping said beam past points in space to generate a number of pulses of infrared energy at each point in space for causing the guidance system in said heat seeking missile to guide said missile away from said target, said spatial modulating means including a squirrel cage arrangement of reflectors adapted for movement about said infrared source, said squirrel cage including reflective blades arranged and configured such that radiation from said infrared source is reflected by one blade to the back surface of a preceding blade, the radiation reflected by the back surface of a preceding blade emanating in a collimated beam.

7. The apparatus of claim 6 wherein the front surface of a blade has an ellipsoidal cross section and wherein the back surface of a blade has a parabolic cross section.

8. The apparatus of claim 7 wherein said infrared generating means is located at the focus of all the ellipses to which the front surfaces of all of said blades conform, the other focus of an ellipse to which the front surface of a given blade conforms being the focus of the parabola to which the back surface of said given blade conforms.

9. Apparatus for countermeasuring a heat seeking missile approaching a heat radiating target in which the heat seeking missile has a guidance system comprising:

an infrared source at said target, and means for spatially modulating the radiation from said infrared source by generating a beam of infrared radiation and by periodically sweeping said beam past points in space to generate a number of pulses of infrared energy at each point in space for causing the guidance system in said heat seeking missile to guide said missile away from said target, said spatial modulating means including reflective means for focusing said radiation into a beam such that the beam is reflected at least once by said reflective means; and means for revolving said focusing means about said source.

10. The apparatus of claim 9 wherein said reflective focusing means includes a number of reflectors sufficient to form multiple infrared beams, and wherein said source is stationary.

11. The apparatus of claim 9 wherein the energy in said beam is once reflected by said focusing means.

12. The apparatus of claim 9 wherein the energy in said beam is twice reflected by said focusing means.

13. The apparatus of claim 9 wherein said beam is swept 360° in azimuth.

14. Apparatus for countermeasuring a heat seeking missile approaching a heat radiating target in which the heat seeking missile has a guidance system comprising:

an infrared source at said target, and means for spatially modulating the radiation from said infrared source by generating a beam of infrared radiation and by periodically sweeping said beam past points in space to generate a number of pulses of infrared energy at each point in space for causing the guidance system in said heat missile device to guide said missile away from said target, said spatial modulating means including reflective means adapted for movement relative to said infrared source for forming an infrared beam from the infrared radiation from said infrared source such that said beam is reflected at least once.

15. Apparatus of claim 14 wherein said movement includes rotation of said beam forming means about said infrared source.

16. The apparatus of claim 14 wherein said movement includes reciprocation of said beam forming means to form and sweep said beam.

17. A method of countermeasuring a heat seeking missile approaching a heat radiating target in which the heat seeking missile has a guidance system comprising the steps of:

providing an infrared source at said target, and spatially modulating the radiation from said infrared source by generating a beam of infrared radiation and by periodically sweeping said beam past points in space to generate a number of pulses of infrared energy at each point in space for causing the guidance system in said heat seeking missile to guide said missile away from said target, said spatial modulating step including the use of a reflective means adapted for movement about said infrared source, said reflective means including reflective elements each conforming in contour to a portion of a parabola having said infrared source at its focus, said reflective elements being spaced from said generating means and positioned such that all of the radiation from said generating means is reflected once and is collimated into beams which radiate outwardly from said source at different angles.

18. The method of claim 17 wherein said beams are equally spaced about said source.

19. The method of claim 17 wherein a portion of a preceding reflective element blocks radiation from a portion of a succeeding reflective element to form one edge of a beam.

20. The method of claim 19 wherein the portion of the preceding element blocking radiation from a portion of a succeeding reflective element includes an end portion of said preceding reflective element.

21. The method of claim 19 wherein each of said reflective elements has a nonreflective back surface and wherein a portion of said nonreflective back surface serves as the portion of the preceding reflective element which blocks radiation from a portion of a succeeding reflective element.

22. A method of countermeasuring a heat seeking missile approaching a heat radiating target in which the heat seeking missile has a guidance system comprising the steps of:

providing an infrared source at said target, and spatially modulating the radiation from said infrared source by generating a beam of infrared radiation and by periodically sweeping said beam past points in space to generate a number of pulses of infrared energy at each point in space for causing the guidance system in said heat seeking missile to guide said missile away from said target, said spatial modulating step including the use of a squirrel cage arrangement of reflectors adapted for movement about said infrared sources, said squirrel cage including reflective blades arranged and configured such that radiation from said infrared source is reflected by one blade to the back surface of a preceding blade, the radiation reflected by the back surface of a preceding blade emanating in a collimated beam.

23. The method of claim 22 wherein the front surface of a blade has an ellipsoidal cross section and wherein the back surface of a blade has a parabolic cross section.

24. The method of claim 22 wherein said infrared generating means is located at the focus of all the ellipses to which the front surfaces of all of said blades conform, the other focus of an ellipse to which the front surface of a given blade conforms being the focus of the parabola to which the back surface of said given blade conforms.

25. A method of countermeasuring a heat seeking missile approaching a heat radiating target in which the heat seeking missile has a guidance system comprising the steps of:

providing an infrared source at said target, and spatially modulating the radiation from said infrared source by generating a beam of infrared radiation and by periodically sweeping said beam past points in space to generate a number of pulses of infrared energy at each point in space for causing the guidance system in said heat seeking missile to guide said missile away from said target, said spatial modulating step including the use of reflective means for focusing said radiation into a beam such that said beam is reflected at least once by said reflective means; and means for revolving said focusing means about said source.

26. The method of claim 25 wherein said reflective focusing means includes a number of reflectors sufficient to form multiple infrared beams, and wherein said source is stationary.

27. The method of claim 25 wherein the energy in said beam is once reflected by said focusing means.

28. The method of claim 25 wherein the energy in said beam is twice reflected by said focusing means.

29. The method of claim 25 wherein said beam is swept 360° in azimuth.

30. A method of countermeasuring a heat seeking missile approaching a heat radiating target in which the heat seeking missile has a guidance system comprising the steps of:

providing an infrared source at said target, and spatially modulating the radiation from said infrared source by generating a beam of infrared radiation and by periodically sweeping said beam past points in space to generate a number of pulses of infrared energy at each point in space for causing the guidance system in said heat missile to guide said missile away from said target, said spatial modulating step including the use of a reflective means adapted for movement relative to said infrared source for forming an infrared beam from the infrared radiation from said infrared source such that said beam is reflected at least once by said reflective means.

31. The method of claim 30 wherein said movement includes rotation of said beam forming means about said infrared source.

32. The method of claim 30 wherein said movement includes reciprocation of said beam forming means to form and sweep said beam.

* * * * *